US006772423B2

United States Patent
Yamamoto

(10) Patent No.: US 6,772,423 B2
(45) Date of Patent: Aug. 3, 2004

(54) DISK DRIVE UNIT FOR FACILITATING THE EJECTION AND RETRACTION OF A TRAY WITH RESPECT TO A MAIN BODY

(75) Inventor: Toyoki Yamamoto, Nagano (JP)

(73) Assignee: Shinano Kenshi Kabushiki Kaisha, Nagano (JP)

(*) Notice: Subject to any disclaimer, the term of this patent is extended or adjusted under 35 U.S.C. 154(b) by 105 days.

(21) Appl. No.: 10/079,488

(22) Filed: Feb. 22, 2002

(65) Prior Publication Data

US 2002/0141318 A1 Oct. 3, 2002

(30) Foreign Application Priority Data

Mar. 27, 2001 (JP) .................................... 2001-089319

(51) Int. Cl.[7] ............................................ G11B 33/02
(52) U.S. Cl. ..................................................... 720/606
(58) Field of Search ............................. 369/75.2, 75.1, 369/77.1

(56) References Cited

U.S. PATENT DOCUMENTS 5,867,338 A * 2/1999 Ohira et al. ............... 369/75.1
5,914,929 A * 6/1999 Kato et al. ................. 369/75.2
6,044,058 A * 3/2000 Miyazaki et al. ........... 369/291
6,111,838 A * 8/2000 Akiba ....................... 369/77.1
6,272,090 B1 * 8/2001 Maeda ...................... 369/77.1

* cited by examiner

Primary Examiner—David Davis
(74) Attorney, Agent, or Firm—Birch, Stewart, Kolasch & Birch, LLP

(57) ABSTRACT

In the disk drive unit of the present invention, an eject button for ejecting and retracting a tray can be easily pushed while the tray is ejected, and the tray can be ejected and retracted by same action. The disk drive unit comprises: a main body; a tray for holding an optical disk, the tray retracted into and ejected from the main body; a moving mechanism for moving the tray, the moving mechanism including a motor for retracting the tray into and ejecting the same from the main body; and an eject button actuating the moving mechanism so as to eject the tray into and eject the same from the main body, the eject button provided in a front face of the tray.

2 Claims, 5 Drawing Sheets

FORWARD

FORWARD

DISK DRIVE UNIT FOR FACILITATING THE EJECTION AND RETRACTION OF A TRAY WITH RESPECT TO A MAIN BODY

BACKGROUND OF THE INVENTION

The present invention relates to a disk drive unit, more precisely relates to a disk drive unit having a tray capable of holding an optical disk and being retracted into and ejected from a main body.

The disk drive unit reproduces data from and records data on an optical disk, e.g., CD, DVD. Generally, the optical disk is mounted on the tray and loaded in the disk drive unit.

A front view of a conventional disk drive unit is shown in FIG. 8.

A tray 12 can be ejected forward from a front face of a main body 11 of the disk drive unit 10. An eject button 13 for ejecting the tray 12, a play button 14 for reproducing recorded data, a volume controller 15, etc. are provided in the front face of the main body 11.

In FIG. 8, the tray 12 is retracted in the main body 11. When the disk is loaded or taken out, a user pushes the eject button 13 provided in the front face of the main body 11.

The eject button 13 is usually provided under the tray 12 because of parts arrangement and cable arrangement.

A moving mechanism (not shown), which is provided in the disk drive unit 10 and automatically moves the tray 12, is actuated by pushing the eject button 13. The moving mechanism includes a motor for moving the tray 12.

Since the eject button 13 is provided under the tray 12, the tray 12 which has been ejected obstructs user's action of pushing the eject button 13. Therefore, it is difficult to push the eject button 13 so as to retract the tray 12.

To easily retract the tray 12, the moving mechanism can be actuated by slightly pushing a front face of the ejected tray 12.

Namely, in the conventional disk drive unit, the user must execute different action so as to eject and retract the tray 12, so the user, especially an unfamiliar user, is confused.

In a book-size personal computer, an eject button is provided in a front face of a tray, but the eject button is not used for retracting the tray. The tray is manually pushed until the tray is fully retracted in a disk driving unit.

In the conventional book-size personal computer too, the tray is ejected and retracted by user's different action, so the user must be confused.

SUMMARY OF THE INVENTION

An object of the present invention is to provide a disk drive unit, in which an eject button for ejecting and retracting a tray can be easily pushed while the tray is ejected.

Another object of the present invention is to provide a disk drive unit, in which the tray can be ejected and retracted by same action.

To achieve the objects, the disk drive unit of the present invention comprises:
  a main body;
  a tray for holding an optical disk, the tray being retracted into and ejected from the main body;
  means for moving the tray, the moving means including a motor for retracting the tray into and ejecting the same from the main body; and
  an eject button actuating the moving means so as to retract the tray into and eject the same from the main body, the eject button being provided in a front face of the tray.

With this structure, the eject button can be easily pushed while the tray is retracted, and the tray can be ejected and retracted by the same action: pushing the eject button.

The disk drive unit may further comprise means for detecting movement of the tray,
  wherein the detecting means detects the movement of the tray and actuates the moving means to eject the tray from the main body when the eject button is pushed while the tray is retracted in the main body, and
  the detecting means detects the movement of the tray and actuates the moving means to retract the tray into the main body when the eject button is pushed and the tray is moved toward the main body while the tray is ejected form the main body.

With this structure, by pushing the eject button provided in the front face of the ejected tray, the tray is also pushed into the main body so that the moving means automatically loads the disk even if the eject button does not directly actuate the detecting means. Anyway, the tray can be automatically ejected and retracted by the same action: pushing the eject button.

In the disk drive unit, the detecting means may include:
  a lever being attached to the tray, the lever being pushed and projected by the eject button;
  a check gear being pushed by the lever projected, the check gear being engaged with a rack extended in the direction of the movement of the tray; and
  a sensor for detecting rotation of the check gear.

With this structure, the detecting means actuates the moving means to automatically eject and retract the tray in the both cases of: pushing the eject button; and pushing and moving the tray inward.

Further, in the disk drive unit, the tray may be detachably attached to the main body. With this structure, maintenance and repair can be easily executed.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENT

A preferred embodiment of the present invention will now be described in detail with reference to the accompanying drawings.

Figure 1:
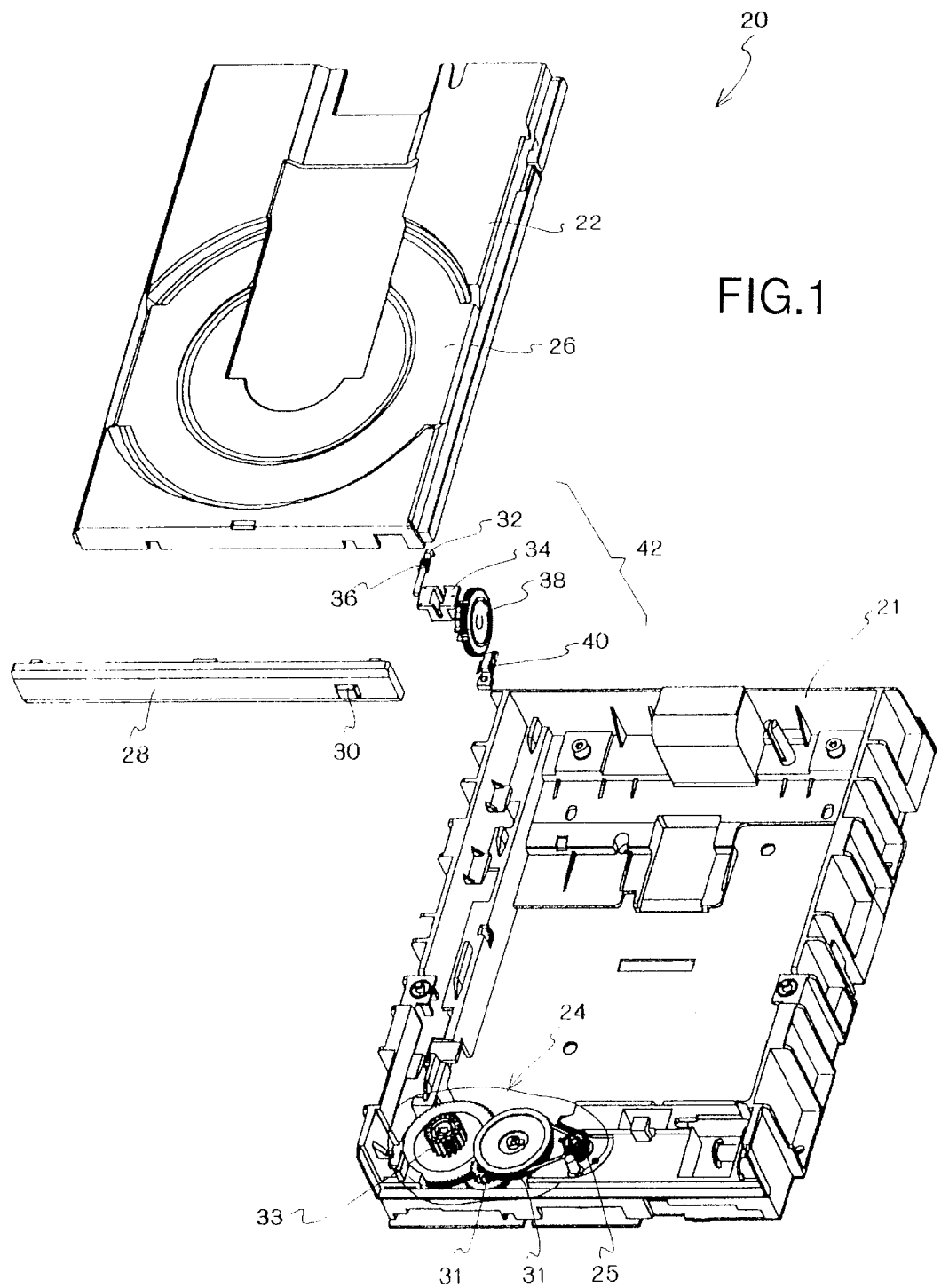
FIG. 1 is an exploded perspective view of an embodiment of a disk drive unit of the present invention.
Figure 2:
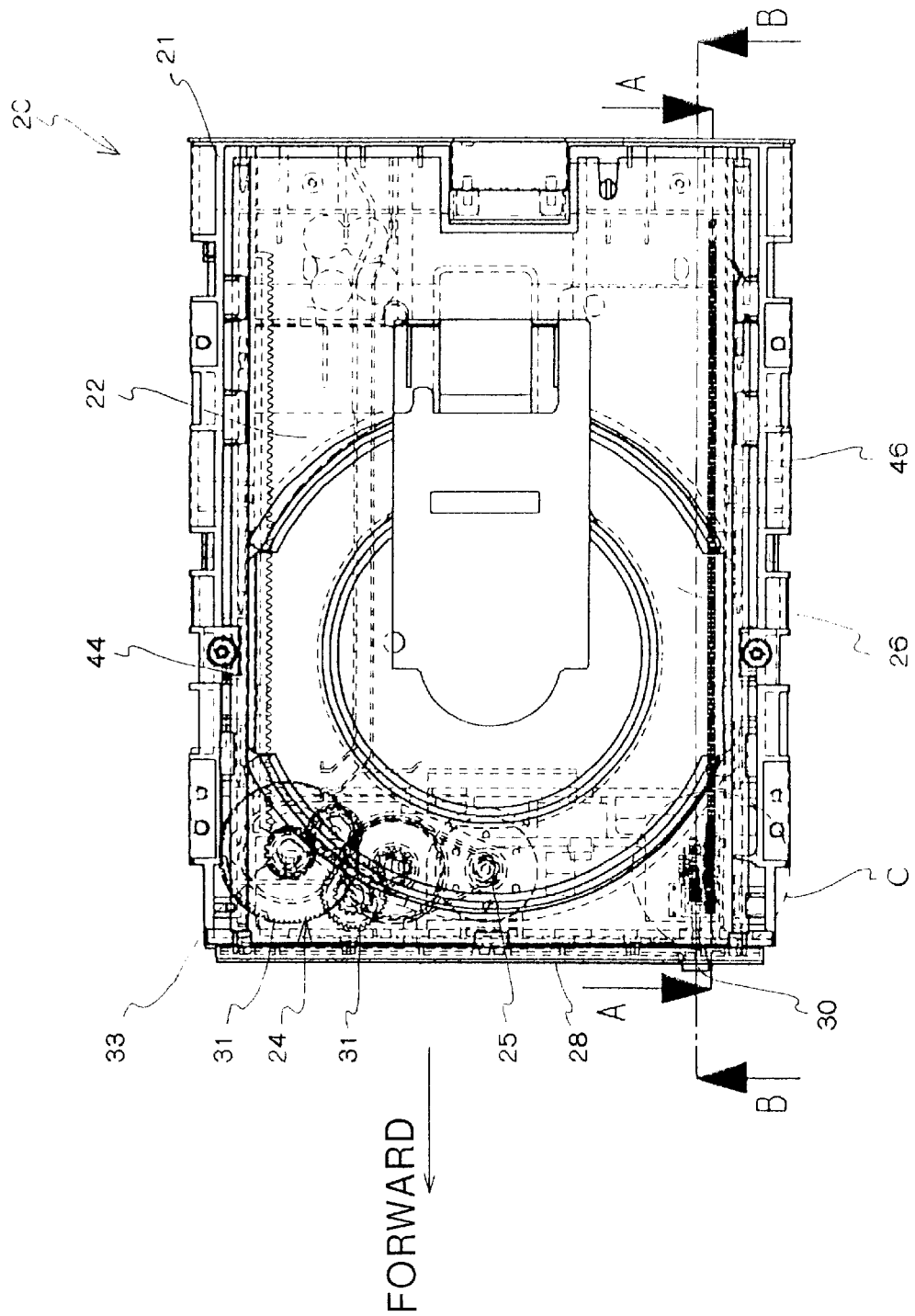
FIG. 2 is a plan view of the disk drive unit in which a tray is retracted.
Figure 3:
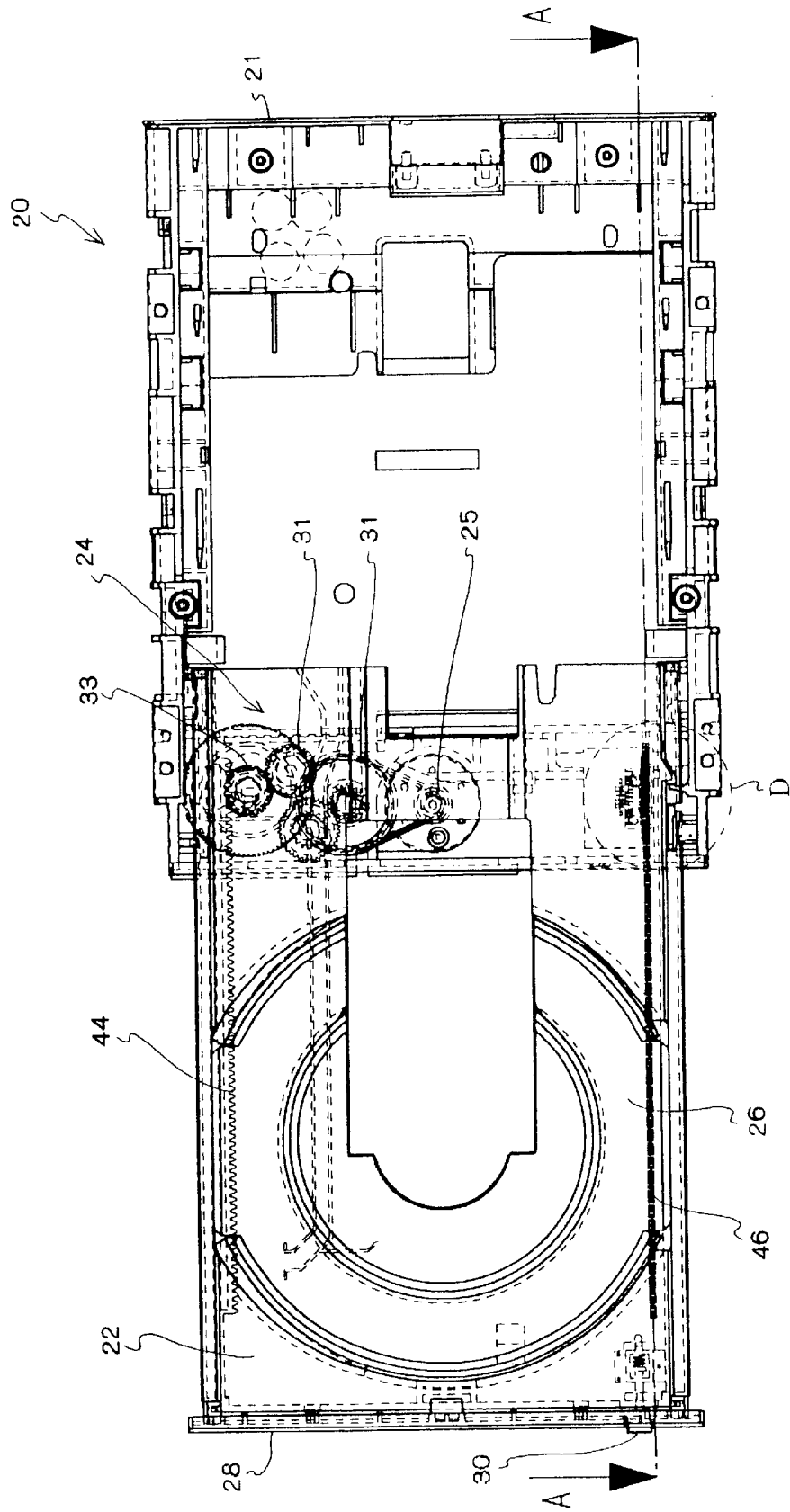
FIG. 3 is a plan view of the disk drive unit in which the tray is ejected.
Figure 4:
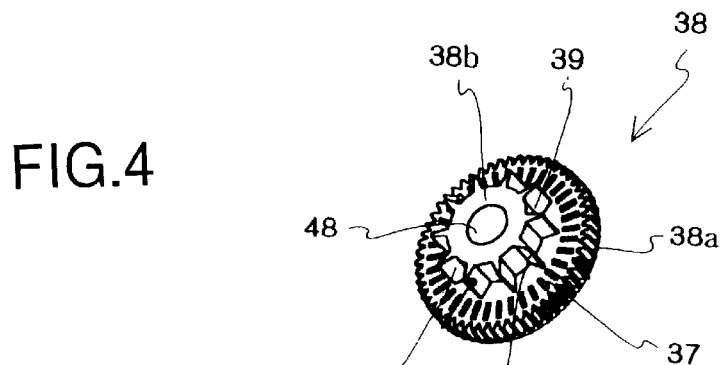
FIG. 4 is a perspective view of a check gear.

FIG. 1 is an exploded perspective view of an embodiment of a disk drive unit of the present invention; FIG. 2 is a plan view of the disk drive unit in which a tray is retracted; and FIG. 3 is a plan view of the disk drive unit in which the tray is ejected.

Firstly, an outline of the disk drive unit 20 will be explained.

The disk drive unit 20 has a tray 22, which can be ejected from the unit 20 and retracted into the unit 20 and on which an optical disk will be mounted for loading. A main chassis 21 constitutes a main body of the disk drive unit 20.

A moving mechanism 24 for automatically ejecting and retracting the tray 22 is provided in the main chassis 21. The moving mechanism 24 includes: a motor 25; a plurality of gears 31 and 33 capable of transmitting power of the motor 25 to the tray 22; and a gear 33 engaging with the tray 22.

A disk holding cavity 26, in which the optical disk will be accommodated, is formed in a center part of the tray 22.

A tray mask 28, which acts as a decorative panel, is attached on a front face of the tray 22. An eject button 30 capable of actuating the moving mechanism 24, which ejects and retracts the tray 22, is provided to the tray mask 28.

The eject button 30 is linked with a detecting mechanism 42 capable of detecting movement of the tray 22.

The detecting mechanism 42 includes: a lever 32 directly transmitting action of pushing the eject button 30; a check gear 38 pushed by the lever 32; and a sensor 40 for detecting rotation of the check gear 38.

A pair of racks 44 and 46 are provided on a bottom face of the tray 22 and respectively extended along longitudinal edges thereof.

The rack 44 is provided on the moving mechanism 24 side, and teeth of the rack 44 are projected inward. The gear 33 of the moving mechanism 24 is engaged with the rack 44. By rotating the gear 33, the rack 44 converts the rotation of the gear 33 into linear motion (ejection and retraction) of the tray 22.

The rack 46 is provided on the detecting mechanism 42 side, and teeth of the rack 46 are projected downward.

The check gear 38 of the detecting mechanism 42 is engaged with the rack 46. The linear motion of the tray 22 along the rack 46 converted into rotation of the check gear 38.

Next, the detecting mechanism 42 will be explained.

Firstly, the check gear 38 will be explained with reference to FIG. 5. The check gear 38 is provided in the main chassis 21 and can freely rotate about a center rotary shaft 48.

The check gear 38 has an engaging section 38a, which is engaged with the rack 46 of the tray 22, and a receiving section 38b, which is pushed by the eject button 30.

Diameter of the engaging section 38a is greater than that of the receiving section 38b. The engaging section 38a has many teeth capable of engaging with the rack 46. On the other hand, the receiving section 38a is engaged with no gear but has a plurality of teeth 39, which will come into contact with the lever 32 extended from the eject button 30.

A plurality of slits 37, which are used for detecting the rotation of the check gear 38 by the sensor 40, are formed in the engaging section 38a.

Figure 5:
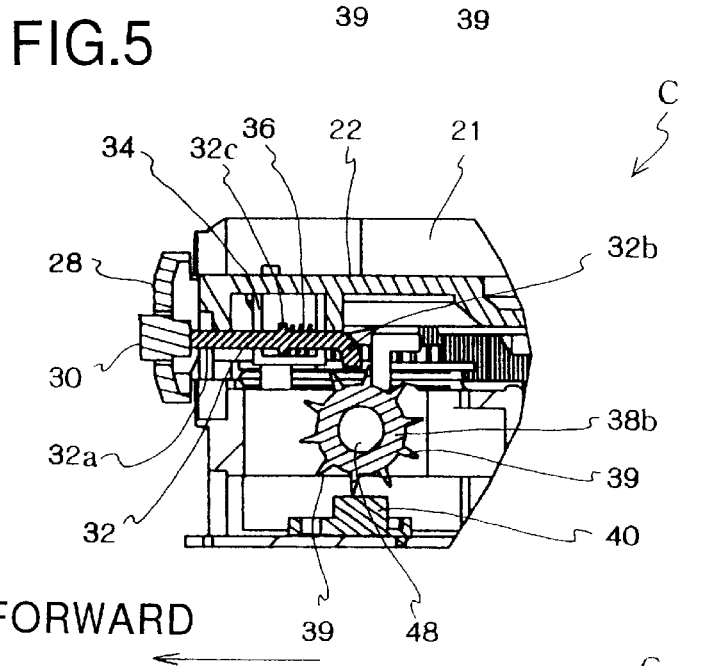
FIG. 5 is a partial sectional view of a part "C" taken along a line A—A of FIG. 2.
Figure 6:
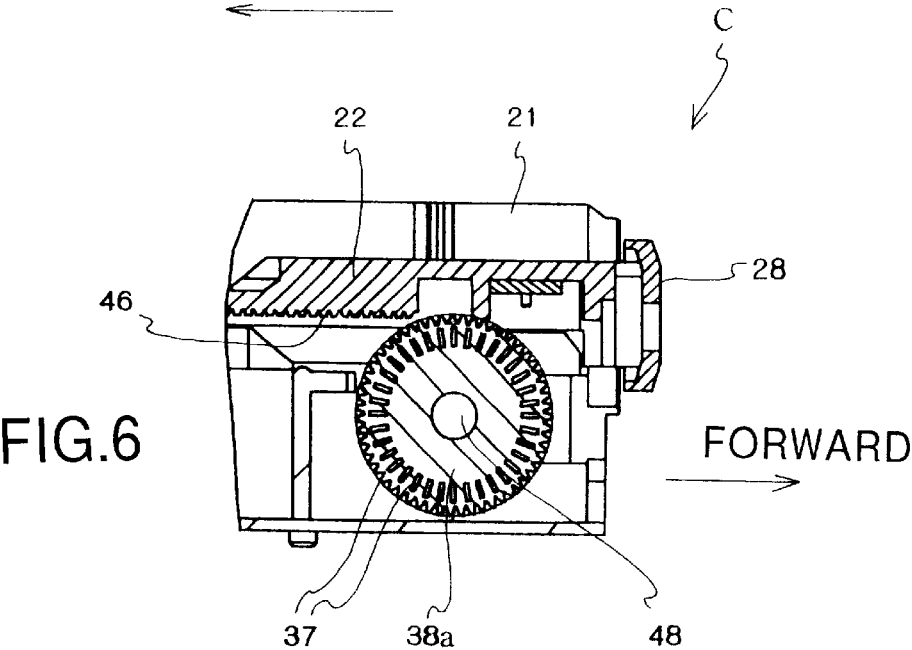
FIG. 6 is a partial sectional view of the part "C" taken along a line B—B of FIG. 2.
Figure 7:
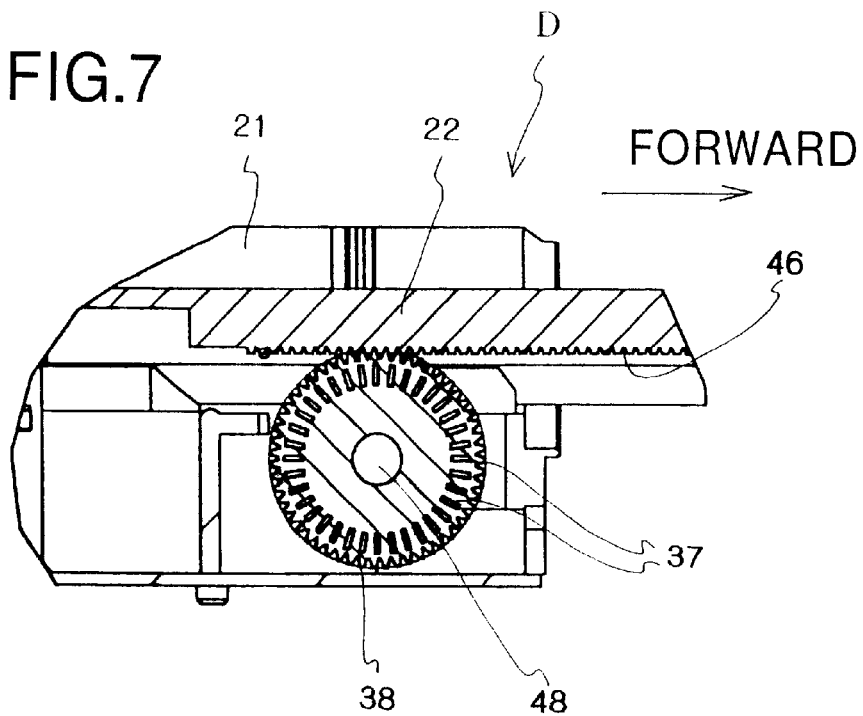
FIG. 7 is a partial sectional view of a part "D" taken along a line A—A of FIG. 3.
Figure 8:
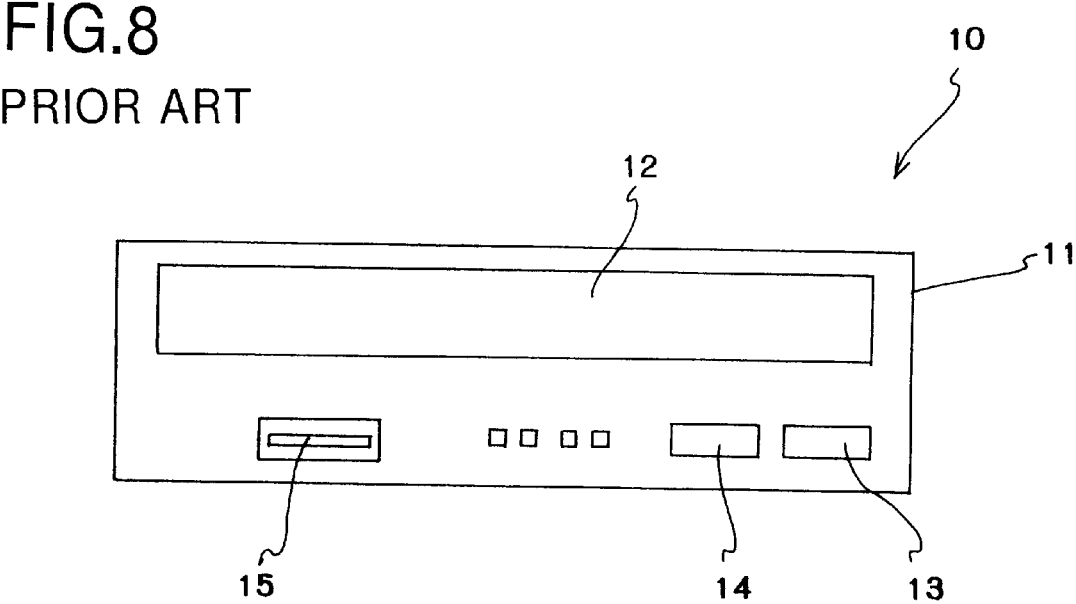
FIG. 8 is a front view of the conventional disk drive unit.

FIG. 5 is a partial sectional view of a part "C" taken along a line A—A of FIG. 2; FIG. 6 is a partial sectional view of the part "C" taken along a line B—B of FIG. 2; and FIG. 7 is a partial sectional view of a part "D" taken along a line A—A of FIG. 3.

FIG. 5 shows a connecting structure between the eject button 30 and the detecting mechanism 42.

A rear face of the eject button 30 contact one end 32a of the lever 32 extending inward. The lever 32 is accommodated in a case 34 provided on the bottom face of the tray 22. With this structure, the lever 32 is attached to the tray 22.

A spring 36 covers a part of the lever 32 in the case 34. The spring 36 is held between an inner rear face of the case 34 and a flange 32c of the lever 32, so that the spring 36 always biases the lever 32 forward (toward the eject button 30).

The other end 32b of the lever 32 contacts the teeth 39 of the receiving section 38b of the check gear 38 when the eject button 30 pushes the lever 32.

The sensor 40 is provided under the receiving section 38b of the check gear 38 so as to detect the rotation of the check gear 38. In the present embodiment, the sensor 40 is a magnetic resistance (MR) sensor.

The check gear 38 is coated with magnetic powders or a material of the check gear 38 includes magnetic powders. With this structure, the slits 37 of the engaging section 38a of the check gear 38 vary magnetic field intensity, with respect to the MR sensor 40, with the rotation of the check gear 38, so that the sensor 40 can detect the rotation of the check gear 38.

FIGS. 6 and 7 show a connecting structure between the tray 22 and the check gear 38.

As described above, the teeth of the engaging section 38a of the check gear 38 engage with the rack 46 of the tray 22. When the tray 22 is ejected and retracted by the moving mechanism 24 with the linear motion, the check gear 38 is rotated.

Note that, the eject button 30 is not shown in FIGS. 6 and 7.

Successively, action of the disk drive unit 20 will be explained with reference to FIGS. 1–7.

Firstly, the action of ejecting the tray 22 will be explained.

To eject the tray 22, a user pushes the eject button 30 inward. By pushing the eject button 30, the eject button 30 inwardly pushes and moves the lever 32 against elasticity of the spring 36.

The other end 32b of the lever 32, which has been moved inward, contacts the teeth 39 of the receiving section 38b of the check gear 38, so that the check gear 38 is rotated.

The rotation of the check gear 38 is detected by the sensor 40.

The sensor 40 sends a signal or signals of detecting the rotation of the check gear 38 to a control mechanism (not shown) including a microprocessor.

Upon receiving the signal or signals, the control mechanism knows that the check gear 38 is rotated in the state of retracting the tray 22, so the control mechanism sends a signal or signals for actuating the moving mechanism 24 so as to eject the tray 22. Upon receiving the signal or signals for actuating, the moving mechanism 24 rotates the motor 25 so as to eject the tray 22.

While ejecting the tray 22, the sensor 40 continuously detects the rotation of the check gear 38 and sends a rotation signal to the control mechanism with each rotation of the check gear 38. Upon receiving the rotation signal from the sensor 40, the control mechanism counts total number of the rotation signals so as to know if the tray 22 reaches a prescribed ejection distance or not.

If the control mechanism counts the number of the rotation signals from the sensor 40 and judges that the ejected tray 22 reaches the prescribed ejection distance, the control mechanism stops the moving mechanism 24. By stopping the moving mechanism 24, the ejection of the tray 22 is terminated.

Next, the action of retracting the tray 22 will be explained.

To retract the tray 22, the user pushes the eject button 30 inward. By pushing the eject button 30, the eject button 30 inwardly pushes and moves the lever 32 against elasticity of the spring 36, but the tray 22 has been ejected together with the lever 32. Therefore, the other end 32b of the pushed lever 32 cannot reach the receiving section 38b of the check gear 38.

The check gear 38 is not directly rotated even if the eject button 30 is pushed. But the ejected tray 22 is slightly moved inward by pushing the eject button 30.

If the ejected tray 22 is slightly moved inward, the check gear 38 engaging with the rack 46 of the tray 22 is slightly rotated. The slight rotation of the check gear 38 can be detected by the sensor 40, and the sensor 40 sends a signal or signals indicating the fact to the control mechanism.

Upon receiving the signal or signals, the control mechanism knows that the check gear 38 is slightly rotated in the state of ejecting the tray 22, so the control mechanism sends a signal or signals for actuating the moving mechanism 24 so as to retract the tray 22. Upon receiving the signal or signals for actuating, the moving mechanism 24 rotates the motor 25 and the gear 31, etc., so that the gear 33 and the rack 44 inwardly move and retract the tray 22.

While retracting the tray 22, the sensor 40 continuously detects the rotation of the check gear 38 and sends the rotation signal to the control mechanism with each rotation of the check gear 38. Upon receiving the rotation signal from the sensor 40, the control mechanism counts total number of the rotation signals so as to know if the tray 22 reaches a prescribed retracting position or not.

If the control mechanism counts the number of the rotation signals from the sensor 40 and judges that the ejected tray 22 reaches the prescribed retracting position, the control mechanism stops the moving mechanism 24. By stopping the moving mechanism 24, the retraction of the tray 22 is terminated.

In the present embodiment, the lever 32 provided on the rear side of the eject button 30 is separated from the main chassis 21. Only the racks 44 and 46 of the tray 22 engage with the main chassis 21. Further, the eject button 30 is provided to the tray 22, and no electric connection means are provided between the tray 22 and the main chassis 21. With this structure, the tray 22 can be easily attached to and detached from the main chassis 21.

In the present embodiment, the eject button is provided to the front face of the tray, so the eject button can be easily pushed while the tray is ejected and retracted. And the tray can be ejected and retracted by the same action: pushing the eject button.

The detecting means detects the movement of the tray and actuates the moving mechanism to eject the tray from the main body when the eject button is pushed while the tray is retracted in the main body, and the detecting mechanism detects the movement of the tray and actuates the moving mechanism to retract the tray into the main body when the eject button is pushed and the tray is moved toward the main body while the tray is ejected form the main body. With this structure, by pushing the eject button provided in the front face of the ejected tray, the tray is also pushed into the main body so that the moving mechanism automatically loads the disk even if the eject button does not directly actuate the detecting means. Anyway, the tray can be automatically ejected and retracted by the same action: pushing the eject button.

The detecting means include: the lever being attached to the tray, the lever being pushed and projected by the eject button; the check gear being pushed by the lever projected, the check gear being engaged with the rack extended in the direction of the movement of the tray; and the sensor for rotation of the check gear. With this structure, the detecting mechanism actuates the moving mechanism to automatically eject and retract the tray in the both cases of: pushing the eject button; and pushing and moving the tray inward.

Further, the tray is detachably attached to the main body. With this structure, maintenance and repair can be easily executed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A disk drive unit, comprising:
   a main body:
   a tray for holding an optical disk, said tray being retracted into and ejected from said main body;
   means for moving said tray, said moving means including a motor for retracting said tray into and ejecting the same from said main body;
   an eject button actuating said moving means so as to retract said tray into and eject the same from said main body, said eject button being provided in a front face of said tray,
   means for detecting movement of said tray,
   wherein said detecting means detects the movement of said tray and actuates said moving means to eject said tray from said main body when said eject button is pushed while said tray is retracted in said main body,
   said detecting means detects the movement of said tray and actuates said moving means to retract said tray into said main body when said eject button is pushed and said tray is moved toward said main body while said tray is ejected from said main body, and
   said detecting means includes:
      a lever being attached to said tray, said lever being pushed and projected by said eject button;
      a check gear being pushed by said lever projected, said check gear being engaged with a rack extended in the direction of the movement of said tray; and
      a sensor for detecting rotation of said check gear.

2. The disk drive unit according to claim 1, wherein said tray is detachably attached to said main body.

* * * * *